United States Patent [19]

Kleinecke et al.

[11] Patent Number: 4,463,408
[45] Date of Patent: Jul. 31, 1984

[54] TWO-HIGH MOTOR CONTROL CENTER WITH STAGGERED CUBICLES

[75] Inventors: John D. Kleinecke; Thomas R. Little; Samir F. Farag, all of Wichita Falls, Tex.

[73] Assignee: Siemens-Allis, Inc., Atlanta, Ga.

[21] Appl. No.: 373,091

[22] Filed: Apr. 28, 1982

[51] Int. Cl.³ .............................................. H02B 1/04
[52] U.S. Cl. .............................. 361/342; 200/50 AA; 361/361; 361/391
[58] Field of Search ............... 361/331, 332, 334, 338, 361/339, 341, 342, 361, 390, 391; 200/50 AA; 339/45 R, 45 M

[56] References Cited

U.S. PATENT DOCUMENTS

| | | | |
|---|---|---|---|
| 3,005,064 | 10/1961 | Baird | 200/50 AA |
| 3,440,371 | 4/1969 | Netzel | 200/50 AA |
| 3,562,593 | 2/1971 | Bould | 361/342 |
| 3,628,098 | 12/1971 | Sturdivan | 361/341 |
| 3,633,075 | 1/1972 | Hawkins | 361/339 |
| 3,896,353 | 7/1975 | Burton | 200/50 AA |

Primary Examiner—G. P. Tolin
Attorney, Agent, or Firm—Frederick W. Powers; John L. James

[57] ABSTRACT

A motor control center of the high voltage type which includes a set of three vertically-disposed cubicles. The two lower cubicles house a pair of contactor assemblies, the lowermost contactor assembly being longer than the upper one. The cubicle enclosing the upper contactor is provided with a partition behind which is a compartment containing vertical bus bars. The lowermost cubicle extends beneath this compartment so that the bus bars drop directly down to engage a set of connectors which are also engaged by the lowermost contactor assembly.

2 Claims, 1 Drawing Figure

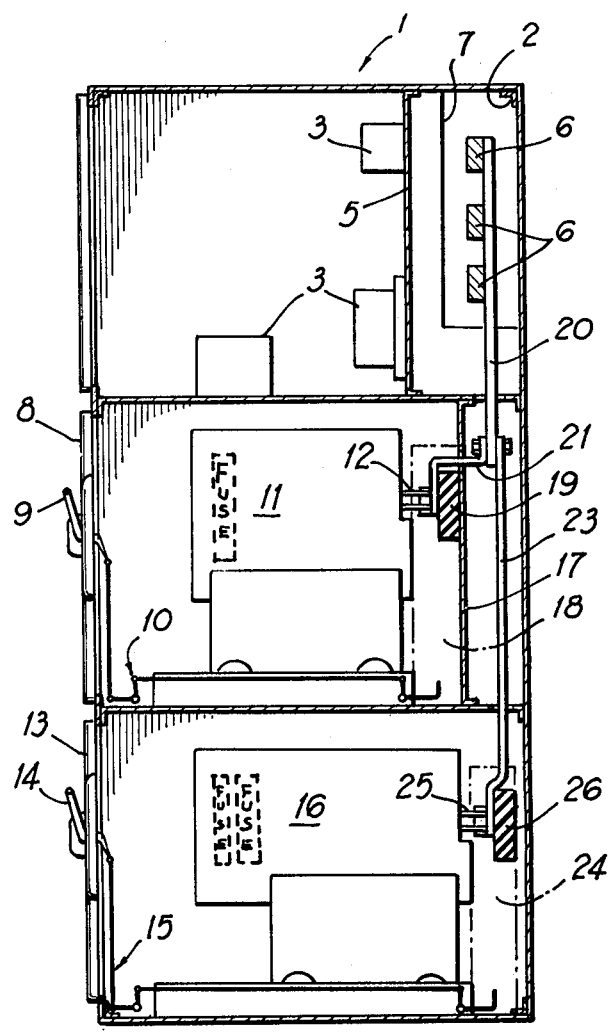

TWO-HIGH MOTOR CONTROL CENTER WITH STAGGERED CUBICLES

BACKGROUND OF THE INVENTION

The present invention relates to motor control centers, and more particularly to metal-enclosed control centers for housing high voltage contactor assemblies.

Motor control centers of the high voltage type, that is, adapted to receive voltages of 1000 volts and above are easily distinguished from lower-voltage motor control centers inasmuch as the large, heavy contactor assemblies required to make and break high voltage circuits are mounted in removable assembies, or carriages, which are racked into individual cubicles. The control apparatus for the contactors is ordinarily housed in a different cubicle, so that it may be repaired or maintained without necessitating access to the high-voltage apparatus.

For ease and economy in manufacturing, and for purposes of standardization, it has been found desirable to use standard size cubicles and mounting apparatus for contactors. At the same time, however, in some cases it has been found necessary to build enclosures of extra depth in order to accommodate oversized contactor carriages. Such contactor carriages are required in high current applications, when double fuses are required. With some contactor designs, the extra fuses are added in tandem in one end of the carriage, effectively adding to the length of the carriage and therefore requiring an extra-deep enclosure. In addition, for some two-high enclosures it has been conventional to run the bus work over the top of the uppermost cubicle so that an additional, overhead compartment must be provided which in turn extends the height of the cabinet above the conventional height. Accordingly, it will be understood that it would be highly advantageous to provide an improved construction for a two-high motor control center for accommodating an extra-deep contactor carriage assembly within the dimensions of an ordinary motor control center cabinet.

It is therefore an object of the present invention to provide a motor control center construction which makes improved use of space.

Another object is to provide a compact two-high motor control center for single and double-fused contactors.

Yet another object is to construct a motor control center of the high-voltage type which is more compact than those theretofore known.

SUMMARY OF THE INVENTION

Briefly stated, in accordance with one aspect of the invention the foregoing objects are achieved by providing a high voltage motor control center enclosure having three vertically-stacked cubicles. An upper cubicle is partitioned to form front and rear compartments, and buswork mounted horizontally in the rear compartment.

Control gear for the high voltage contactors is housed in the front part of the compartment, wherein ready access can be had. The center cubicle is also partitioned, so that buswork may extend vertically behind the partition. A rigid subchassis mounted in front of the partition receives a single-fused contactor carriage assembly. The lowermost cubicle includes another rigid subchassis which extends to a point near the back of the cubicle, providing extra depth so that a double-fused contactor assembly may be accommodated. The rearward portion of the rigid subchassis bears a set of line connections which are engaged by the contactor. These connections are disposed beneath the bus bar compartment of the middle cubicle, and the bus bars are extended directly down to meet the line connections.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawing in which a partly sectioned side elevation of a two-high voltage motor control center is depicted.

DESCRIPTION OF A PREFERRED EMBODIMENT

A motor control center of the high voltage type is comprised of a cabinet 1 including a structural framework 2 formed of angle, channel, or similar stock material. The outer panels of the cabinet are formed of sheet metal which is attached to the framework by means of screws, bolts, or other appropriate fasteners. The center depicted is termed a two-high motor control center, inasmuch as it accommodates two contactors. The contactors are contained within middle and lowermost cubicles, while an uppermost cubicle houses control means 3 including apparatus such as relays, transformers, terminal blocks, and the like. A door 4 is hinged at the front of the cabinet, and provides access to the upper cubicle for servicing or inspecting the control elements. Since the controls operate at a lower voltage than the power which is to be controlled, they are housed in a separate compartment so that they can be serviced or maintained without interrupting the high voltage supplied to other elements within the control center.

A vertical partition 5, preferably of sheet metal, constitutes a rear wall of the front compartment of the cubicle. Control elements may be mounted on the partition, and behind it are mounted a series of horizontal bus bars 6. An access opening 7 at one or both sides of the upper cubicle allows a number of centers of the type shown to be mounted side by side, so that a common, horizontal buswork can be extended through all of the cubicles.

A center cubicle is provided with a door 8 at the front end thereof. A handle 9 is mounted to the front of the cabinet. Handle 9 is interlocked with door 8, and with a racking mechanism 10 shown in idealized form within the cubicle. As is familiar to those skilled in the art, before the door can be opened racking handle 9 must be in a position such that contactor carriage 11 is unracked and disengaged from line voltage connections 12 toward the rear of the cubicle. With the contactor moved back and the handle in the "off" position an interlock is free so that the door may be opened.

A similar door 13 is provided for the lowermost cubicle, with another handle 14 coupled to a similar racking linkage 15. The lowermost cubicle, however, is considerably deeper than the middle one so that it may accommodate an extra-deep contactor carriage 16. Such carriages are provided for high-current application, wherein two sets of fuses are required. Owing to the size and bulk of the fuses, which are ordinarily placed at the end of the carriage nearest the door, the addition of an extra set of fuses extends the length of the carriage to a point where an extra-deep cabinet is normally required.

A metal partition 17 in the middle cubicle divides the cubicle into front and rear compartments. A rigid subchassis 18 is bolted in place in the center compartment for receiving a normal-sized carriage assembly 11. An example of such a structure may be found in co-pending U.S. patent application Ser. No. 373,091, filed Apr. 28, 1982 and entitled "Rigid Subchassis Structure for Motor Control Center or the Like"—Farag et al. As illustrated, connections 12 are mounted on an insulative support 19 extending across the back of the subchassis, and are coupled to bus bars by appropriate connection means. In the present instance, a first, main set of vertical bus bars 20 are connected to horizontal buswork 6, and extend vertically into the rear compartment of the center cubicle. A set of jumpers 21 are bolted between vertical bus bars 20 and connectors 12 for supplying line voltage to the connections. It should here be noted that a second set of connections, for conducting current from the contactors to a load, is also provided at an appropriate point within the subchassis, and connected to other bus work for carrying current to a controlled motor or the like. Load bus work has not been shown in the figures, in order to avoid undue complexity. Once the structure of the present invention is fully appreciated, however, it is believed that the provision of load buswork is straightforward and can be done in a normal manner by any person skilled in the art.

A further set of vertical bus bars 23 extend downwardly from bus work 20, through the rear compartment of the center cubicle. A second rigid subchassis 24, somewhat longer than subchassis 18, is disposed in the lowermost cubicle for receiving extra-deep contactor carriage 16. In a preferred embodiment the construction of subchassis 24 is substantially the same as that of subchassis 18, with the exception of any extended horizontal members which receive the subchassis. In particular, a set of line connections 25 are disposed in the vertically-extending part of the subchassis, for mating with similar connections in the contactor carriage. An insulative support 26 extends along the back of the unit for supporting connectors 25. The lowermost ends of bus bars 23 drop directly down from the rear compartment of the center cubicle, and align with the back of subchassis 24 so that they may be bolted directly to the line connectors 25.

In previous designs it has been conventional to provide line bus work 6 in an overhead duct, adding approximately 10 inches to the total height of the control center enclosure. Since users prefer control centers to have a standard height, ordinarily 90 inches, the illustrated design avoids the complications which may arise from a non-standard height by disposing the buswork behind the control apparatus, where it is not exposed to service personnel but still does not add to the outside dimensions of the motor control center cabinet. Further, by providing vertically-disposed bus work in only the center cubicle the depth of the center cubicle may remain standard, and accept a contactor carriage of normal dimensions. However, by eliminating rear-mounted buswork in the lowermost cubicle, and instead dropping the buswork directly to the line connections of a subchassis, the subchassis which receives the extra long contactor carriage may be extended practically to the rear of the lowermost cubicle. This provides sufficient space for accommodating the oversized contactor carriage, allowing enough room so that the carriage may be unracked yet without the need for providing a nonstandard, extra-deep cabinet for accommodating the double fused contactor assembly.

Although the present design will accommodate only a single high current contactor assembly, the present inventors have found that in practice two-high voltage controllers require only a single high current contactor assembly. It will therefore be appreciated that the present invention constitutes an improved design for a motor control center housing, eliminating overhead bus duct and obviating the need for conventional bus work disposed behind an extra-deep contactor cell and accommodates double-fused contactors in an enclosure of standard dimensions.

What is new and desired to be secured by Letters Patent of the United States is:

1. A high voltage motor control center, comprising;
   a metal cabinet having three vertically disposed cubicles of uniform depth therein;
   a first, upper cubicle comprising a door at a front end thereof;
   a first, vertically-extending partition dividing the uppermost cubicle into a front and rear compartment;
   a plurality of bus bars horizontally disposed within said rear compartment and access at at least one side of said rear compartment for making electrical connection to said bus bars;
   a second vertically-extending partition dividing the middle cubicle into a front and a rear compartment of different sizes than the front and rear compartments of the uppermost cubicle;
   a plurality of vertically-disposed bus bars connected to said horizontal bus bars and extending from said uppermost cubicle into said rear compartment of said middle cubicle;
   a first rigid subchassis releasably coupled to said middle cubicle and disposed therein adjacent said partition, said first subchassis including connection means electrically interconnecting with a first contactor carriage assembly having a depth "d" and jumper means coupling said connection means to said vertically-disposed bus bars, said three cubicles having a uniform depth configured to accommodate said carriage assembly of depth "d";
   a second rigid subchassis disposed within the lowermost cubicle and releasably coupled thereto, said second subchassis having connection means interconnecting a second contactor carriage with said vertically-extending bus bars, said connection means being disposed substantially beneath said rear compartment of said middle cubicle, said second carriage having two sets of fuses extending the depth of the carriage beyond the depth "d"; and
   a plurality of bus bar extensions extending downwardly from said bus bars in said rear compartment of the middle cubicle, and coupled to said connection means in said lowermost cubicle.

2. The invention defined in claim 1, further including handle means mounted to the front surface of said cabinet adjacent said middle and lowermost cubicles;
   a racking mechanism mounted on each of said rigid subchassis for engaging a contactor carriage assembly; and
   a linkage operably connecting each of said handle means to its respective racking linkage.

* * * * *